(12) United States Patent
Etienne

(10) Patent No.: US 7,006,745 B2
(45) Date of Patent: Feb. 28, 2006

(54) METHOD FOR MANUFACTURING AN OPTICAL WAVEGUIDE COMPONENT AND AN OPTICAL WAVEGUIDE COMPONENT PRODUCED USING THE METHOD

(75) Inventor: Pascal Etienne, Castries (FR)

(73) Assignees: Centre National de la Recherche Scientifique, Paris Cedex (FR); Universite de Montpellier II, Montpellier Cedex (FR)

(*) Notice: Subject to any disclaimer, the term of this patent is extended or adjusted under 35 U.S.C. 154(b) by 229 days.

(21) Appl. No.: 10/466,606

(22) PCT Filed: Jan. 18, 2002

(86) PCT No.: PCT/FR02/00210

§ 371 (c)(1),
(2), (4) Date: Dec. 3, 2003

(87) PCT Pub. No.: WO02/057810

PCT Pub. Date: Jul. 25, 2002

(65) Prior Publication Data

US 2004/0071426 A1    Apr. 15, 2004

(30) Foreign Application Priority Data

Jan. 19, 2001   (EP) .................... 01400170

(51) Int. Cl.
*G02B 6/10* (2006.01)
*H01L 21/00* (2006.01)
*C03B 37/023* (2006.01)

(52) U.S. Cl. ............... 385/129; 385/130; 385/131; 385/132; 385/141; 438/31; 65/385; 65/395; 65/403

(58) Field of Classification Search .......... 385/14, 385/129, 130, 131, 132, 141; 438/31; 65/385, 65/395, 403
See application file for complete search history.

(56) References Cited

U.S. PATENT DOCUMENTS

| | | | |
|---|---|---|---|
| 5,110,408 A | * | 5/1992 | Fujii et al. ............ 216/75 |
| 5,841,928 A | | 11/1998 | Maxwell et al. |
| 6,054,253 A | | 4/2000 | Fardad et al. |
| 6,377,716 B1 | * | 4/2002 | Veldhuis et al. ........ 385/1 |
| 2001/0044481 A1 | * | 11/2001 | Wu et al. ........... 522/153 |
| 2004/0071426 A1 | * | 4/2004 | Etienne ............. 385/129 |
| 2005/0048688 A1 | * | 3/2005 | Patel et al. ........... 438/53 |

OTHER PUBLICATIONS

Coudray et al.; "Sol-gel channel waveguide on silicon: fast direct imprinting and low cost fabrication", *Optics Communications, NL*, vol. 143, No. 4-6, pp. 199-202 (Nov. 15, 1997).

(Continued)

*Primary Examiner*—Brian M. Healy
(74) *Attorney, Agent, or Firm*—Leydig, Voit & Mayer, Ltd.

(57) ABSTRACT

A method for manufacturing an optical waveguide component with several layers stacked on a silicon substrate. The layers include a buffer layer, a first substrate, a guiding layer on the buffer layer and including an optical waveguide, and an outer layer as protection against external stresses. The layers are made from an organic-inorganic hybrid using a sol-gel process. An additional layer is disposed on the guiding layer so that a symmetrical structure is produced that has the same refractive index around the waveguide in the guiding layer.

15 Claims, 1 Drawing Sheet

OTHER PUBLICATIONS

Najafi et al.; "Sol-Gel Glass Waveguide and Grating on Silicon", *J. of Lightwave Tech.*, vol. 16, No. 9, pp. 1640-1646, (Sept. 1, 1998).

Touam et al.; "Organoaluminophosphate sol-gel silica glass thin films for integrated optics", *Thin Solid Films, Elsevier Science S.A.*, vol. 307, No. 1-2, pp. 203-207, (Oct. 10, 1997).

* cited by examiner

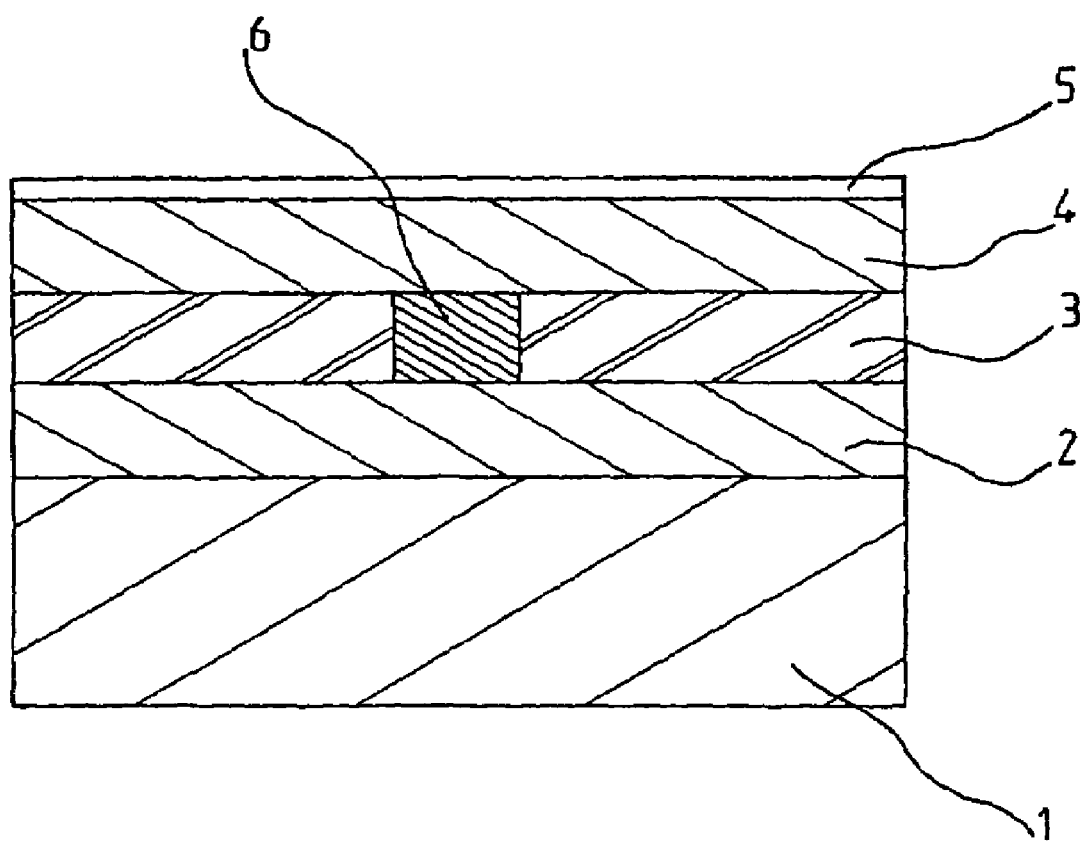

ns. By withdraw-
METHOD FOR MANUFACTURING AN OPTICAL WAVEGUIDE COMPONENT AND AN OPTICAL WAVEGUIDE COMPONENT PRODUCED USING THE METHOD

FIELD OF THE INVENTION

The invention concerns a method for manufacturing an optical waveguide component with several layers stacked on a silicon substrate, comprising a buffer layer arranged on the substrate, a guiding layer arranged on the buffer layer and in which a waveguide device is fabricated, and an outer protection layer protecting against external stresses. The invention also concerns an optical waveguide component obtained using this method.

Components of this type are already known in which the protection layer is directly deposited on the guiding layer.

BACKGROUND

The purpose of the present invention is to improve known waveguide components, in particular to improve wave transmission properties and to allow the fabrication of components having greater integration density.

SUMMARY OF THE INVENTION

To achieve this purpose, in the method of manufacture of the invention an additional layer is deposited on the waveguide layer to produce a symmetrical structure having the same refractive index around the waveguide device made in the guiding layer.

According to one characteristic of the invention, the additional layer deposited on the guiding layer is a second buffer layer having the same refractive index as a first buffer layer.

According to another characteristic, the second buffer layer is made from the same solution as the first buffer layer deposited on the silicon substrate.

According to a further characteristic, the waveguide device is made in the guiding layer by exposing the zones in this layer, which are to form the waveguide device, to ultraviolet radiation through the additional layer deposited on the guiding layer.

According to yet a further characteristic, exposure to ultraviolet radiation is performed after fabricating the protection layer.

The waveguide component of the invention is characterized in that a second buffer layer is deposited on the waveguide layer, between the waveguide layer and the protection layer, to produce a symmetrical structure having the same refractive index entirely around the waveguide device made in the guiding layer.

BRIEF DESCRIPTION OF DRAWINGS

The invention will be better understood, and other purposes, characteristics, details and advantages thereof will become more clearly apparent in the explanatory description given below with reference to the appended, single, schematic FIGURE which is given solely as an example to illustrate an embodiment of the invention.

DETAILED DESCRIPTION

As illustrated in the single FIGURE, a waveguide component of the invention essentially comprises a silicon substrate 1 on which is stacked, successively from bottom to top, a first buffer layer 2, a guiding layer 3 intended to house a waveguide device 6, a second buffer layer 4 and an upper outer protective layer 5.

The function of the first buffer layer 2 is to insulate the waveguide device from the silicon substrate 1 whose very high refractive index relative to the index of the guiding layer would lead to high losses through radiating modes.

The material of this buffer layer, as of the other layers, is an organic-inorganic hybrid whose composition is chosen to have desired properties, in particular in respect of irradiation, index difference and mechanical resistance. The technology used is a sol-gel process to form a solid deposit on a solid substrate such as silicon, using liquid phase precursors. According to this technology, the silicon substrate is immersed in the solution of liquid precursors. By withdrawing it at constant speed from the solution, a liquid layer is produced on the substrate. The liquid layer is then solidified by heating.

Under the invention, the solution from which the first buffer layer 2 is made contains two organic-inorganic precursors: 3-(Trimethoxysilyl)propyl methacrylate (MAPTMS) and the reaction product between zirconium n-propoxide and methacrylic acid (Zr(OPr)4:MAA). Both are able to form both an organic network and a mineral network. For the buffer layer, only a mineral network is made by hydrolysis and polycondensation of the alkoxide groups.

Buffer layer 2 is dried at a temperature of between 90 and 120° C., advantageously at 100° C., for 15 minutes to one hour, advantageously for 30 minutes.

To fabricate guiding layer 3, the same solution is used as for the buffer layer, but 2.5% photoinitiator is added by weight of MAPTMSS+MAA. The guiding layer is deposited on the first buffer layer 2 using the same immersion-withdrawal technique as for this buffer layer.

The guiding layer is then dried at a temperature of between 60° C. and 80° C., advantageously at 60° C., for a time of 10 to 45 minutes, advantageously for 30 minutes.

The second buffer layer 4 is made from the same solution as the first buffer layer 2 and the guiding layer 3 without adding a photoinitiator. The layer is deposited on the guiding layer, again using the immersion-withdrawal technique, and is then dried at a temperature of between 60° C. and 80° C., advantageously at 60° C., for a time of 10 to 45 minutes, advantageously for 30 minutes.

On this buffer layer 4 is deposited a protection layer 5, which is a hydrophobic and anti-scratch layer to protect the component against external stresses. It must be transparent to ultraviolet (UV) light. It is advantageous to choose an organomineral precursor, such as trimethoxysilane, for fabrication of the protection layer which gives a strongly resistant layer that is highly inert to the environment. The latter is simply hydrolysed with an aqueous 0.01N HCl solution. After the protection layer is deposited, it is dried at a temperature of 60° C. for 20 to 45 minutes, advantageously for 30 minutes.

After the layers are stacked, the stack is irradiated, through a mask placed on the protection layer, by UV radiation, advantageously at a wavelength of 325 nm for a few seconds to a few minutes depending upon the photoinitiator used. Before this irradiation operation, the buffer layers and the guiding layer had the same refractive index. But during this irradiation, in the irradiated zones of the guiding layer under the effect of radiation, an organic network is formed by polymerisation. When polymerised, the zones have a greater refractive index than the index of their surrounding material. The irradiated zones therefore form a waveguide device 6 in the guiding layer.

Subsequently, the stack is stabilised by heat treatment at a temperature of between 100° C. and 200° C. advantageously at 100° C., for a period of between 20 to 45 minutes, advantageously for 30 minutes. The mineral network is then sufficiently cross-linked to render inactive any further UV radiation, by sunlight for example.

Depending upon the composition chosen, the transverse size of the guide and the conditions of radiation exposure, i.e. time and intensity, it is possible to fabricate components suitable for wavelengths ranging from the visible up to 1.55 µm in particular.

In this embodiment, the irradiation occurs after depositing all the layers. It may also be performed not with light in the form of UV radiation using a mask, but directly using a laser. It is through this UV irradiation or laser irradiation that polymerisation occurs in the guiding layer, causing a change in refractive index, allowing the creation of waveguides in the irradiated parts.

According to another embodiment of the invention, the guiding layer is irradiated immediately after it is deposited so as to make the irradiated parts solvent-resistant. The non-irradiated parts are then dissolved using an alcohol solvent, advantageously batanol 1, using the principle of UV photolithography. The second buffer layer is subsequently deposited followed by the protection layer.

Irradiation could also be conducted after depositing the second buffer layer.

Irradiation though the buffer layer makes it possible to avoid an etching operation and therefore simplifies the component manufacturing method. Omission of etching avoids a definition loss which would otherwise be caused. Since no etching is performed, the guides have no surface roughness, a factor which largely contributes to propagation losses though scattering.

It is to be noted that, with the method of the invention, it is very important that layers 3, 4, and 5 undergo only partial drying. If this were not the case, any future irradiation would not allow the fabrication of waveguides having satisfactory quality as the polymerisation of the organic network would be insufficient.

With the method just described, the component of the invention has a symmetrical structure so that the medium surrounding the waveguides made in the guiding layer has the same refractive index. By depositing a second buffer layer on the waveguide layer, which is therefore sandwiched between two identical insulating buffer layers, it is possible to fabricate components with several waveguide layers, one on top of another, or other components of complex configuration having a high integration density.

What is claimed is:

1. A method for manufacturing an optical waveguide component on a silicon substrate, comprising:
   depositing a first buffer layer on the silicon substrate;
   depositing a guiding layer on the first buffer layer for fabrication of a waveguide device;
   depositing an additional layer on the guiding layer; and
   depositing an outer protection layer protecting against external stresses on the additional layer, including forming the buffer, guiding additional, and outer protective layers of an organic-inorganic hybrid in a sol-gel process, so that a symmetrical structure having a uniform refractive index around a waveguide in the guiding layer is produced.

2. The method according to claim 1, wherein the additional layer deposited on guiding layer is a second buffer layer having the same refractive index as the first buffer layer.

3. The method according to claim 2, including making the second buffer layer from the same solution as the first buffer layer.

4. The method according to claim 2, including making the waveguide in the guiding layer by irradiating zones of the guiding layer, which are to form the waveguide, with ultraviolet radiation or with laser light through the additional layer.

5. The method according to claim 4, including irradiating the guiding layer with ultraviolet radiation after fabricating the protection layer.

6. The method according to claim 2, including forming the guiding layer from the same solution as the first and second buffer layers after adding a photoinitiator to the solution.

7. The method according to claim 1, including drying the first buffer layer on the substrate at a temperature between 90° and 120° C., for 15 minutes to one hour.

8. The method according to claim 1, including drying the guiding layer at a temperature between 60 and 80° C. for 10 to 45 minutes.

9. The method according to claim 1, including drying the additional layer at a temperature between 60 and 80° C. for 20 to 45 minutes.

10. The method according to claim 1, including drying the protection layer at a temperature of 60° C. for 20 to 45 minutes.

11. The method according to claim 4, including exposing with ultraviolet radiation including a wavelength of 325 nm, for a few seconds to a few minutes.

12. The method according to claim 4, including, after the guiding by layer is irradiated by ultraviolet radiation, annealing at a temperature between 100 and 120° C., for 20 to 45 minutes.

13. The method according to claim 1, including irradiating the guiding layer immediately after depositing the guiding layer, with ultraviolet radiation or laser light, dissolving and removing non-irradiated parts of the guiding layer, and depositing the additional layer on the guiding layer after removing the non-irradiated parts.

14. A waveguide component fabricated according to the method of claim 4.

15. The waveguide component according to claim 14, wherein the first and second buffer layers are made from the same solution.

* * * * *